F. E. WELLS.
THREAD CUTTING DIE.
APPLICATION FILED DEC. 12, 1910.
1,007,317.
Patented Oct. 31, 1911.
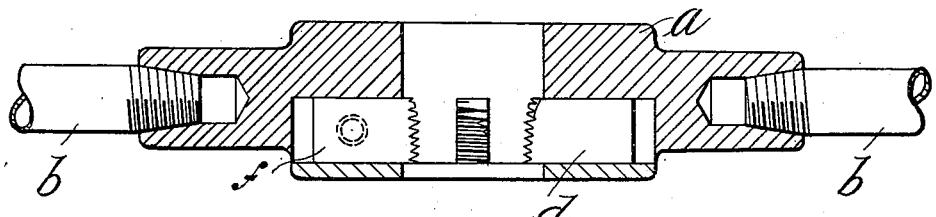
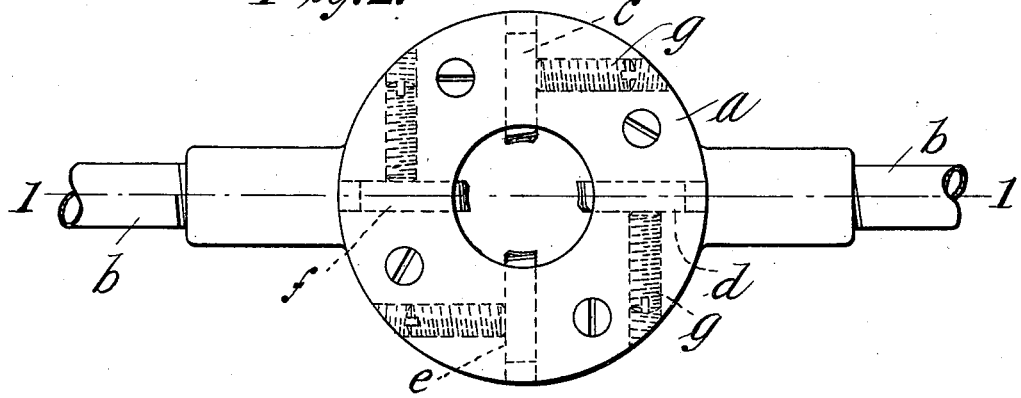
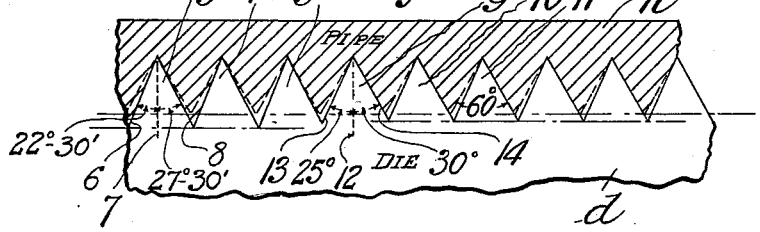
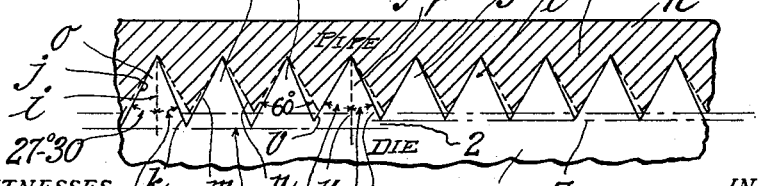
WITNESSES:
H. L. Sprague
Harry W. Bown
INVENTOR.
Frederic E. Wells.
BY
Chapin & Co.
ATTORNEY.

UNITED STATES PATENT OFFICE.

FREDERIC E. WELLS, OF GREENFIELD, MASSACHUSETTS.

THREAD-CUTTING DIE.

1,007,317.

Specification of Letters Patent. Patented Oct. 31, 1911.

Application filed December 12, 1910. Serial No. 596,849.

*To all whom it may concern:*

Be it known that I, FREDERIC E. WELLS, a citizen of the United States of America, residing at Greenfield, in the county of Franklin and State of Massachusetts, have invented new and useful improvements in Thread-Cutting Dies, of which the following is a specification.

This invention relates to improvements in thread-cutting dies, and is designed particularly for cutting threads on pipes used by plumbers and other artisans.

The object of the improvement is to so form the cutting or thread-forming teeth of the die that the threads on a pipe, for instance, may be cut or formed with greater ease. At present, so far as I am aware, when threads are being cut on a pipe of any considerable size, it requires the services of more than one operator.

My invention is made for the purpose of producing a thread-cutting die in which the services of one operator only are required to cut a thread, that is to say to materially lessen the cost of cutting the thread.

The invention consists, in general, in so forming the teeth of the die with such angles that a chip may be removed first from one side of the thread being formed and then from the other side so that greater ease in cutting the thread is the natural result over the present practice wherein the metal is removed from both sides at the same time.

Referring to the drawings forming part of this application,—Figure 1 is a longitudinal sectional view on the line 1—1, Fig. 2, showing the stock for holding the cutters or lands in place. Fig. 2 is a plan view of the complete stock. Figs. 3 and 4 are detail views of the cutters or thread-forming elements showing in detail the shape of the teeth.

Referring to the drawings in detail, $a$ designates the usual stock or die-holding element; $b$ the operating handles; $c$, $d$, $e$, and $f$ designating respectively the series of lands or dies which are suitably retained in the stock $a$, as by means of the set-screws $g$.

A section of pipe on which threads are to be cut is designated at $h$. The cutting teeth of the die $c$ (shown in Fig. 4 and which are constructed exactly like those of the die $f$,) are made by forming the opposite sides of the same with different angles when considered with reference to the lines $i$, $j$, and $k$. The angle between the lines $i$ and $j$ is made 27°—30′, and the angle between the lines $i$ and $k$ is 22°—30′. The dotted lines $m$ and $n$ in the section pipe $h$ show the finished thread, and the angle between these lines is the usual 60°.

It will be noticed that the shape of the first three cutting teeth $o$, $p$, and $q$ of the die $c$ are formed alike and that the shape of the remaining teeth $r$, $s$, and $t$, etc., are formed differently from the first mentioned teeth. These teeth are formed with an angle of 30° between the lines $u$ and $v$, and an angle of 25° between the lines $u$ and $w$; also it will be noticed that the apexes of all of the cutting teeth lie in the same line as shown by the line $x$. The roots of the teeth $o$, $p$, and $q$ lie in a line $y$ that is spaced from the line $z$ which passes through the roots of the teeth $r$, $s$, $t$, etc. This space is designated at 2. The reason for this spacing arises from the fact that the two sets of teeth are formed on different angles, thus causing a difference in the depth of tooth in the die, which is evident from an inspection of the drawing.

Referring now to the shape of the cutting teeth of the die or land $d$ or $f$ shown in Fig. 3, and which are shown in the stock $a$ at $d$ and $f$. The teeth 3, 4, and 5 are formed with the angles 27°—30′ and 22°—30′ arranged oppositely from these same angles in Fig. 4. The angle 22°—30′ occurs between the lines 6 and 7, and the angle 27°—30′ between the lines 7 and 8. Cutting teeth 9, 10, and 11, etc., are also formed oppositely from those shown at $r$, $s$, and $t$ in Fig. 4, that is with an angle of 25° between the lines 12 and 13, and angle of 30° between the lines 12 and 14. The roots of the two sets of cutting teeth shown in Fig. 3 are spaced apart the same distance as that shown in Fig. 4.

The operation of the cutting dies may be described as follows: Considering the die $c$, as commencing the thread-cutting operations, the teeth $o$, $p$ and $q$ will form a portion of the finished thread by removing a chip of greater dimensions on one side than the other, that is to say that part of the cutting teeth which is formed with an angle of 27°—30′ will remove more metal than that part which represents an angle of 22°—30′. The following teeth of the cutter $d$ which is made with the angles of its teeth reversed, will remove a chip on the opposite side of the groove in the partly finished thread, but it will be observed that neither of these cutting teeth will produce a finished thread having the usual 60° angle between its side. In order to finish the thread on the pipe $h$, the cutting teeth (shown at $r$, $s$, $t$, in Fig. 4, and 9, 10, and 11 in Fig. 3,) are formed on one side with a 25° angle, and on its opposite side with a 30° angle. The effect of this construction will be as follows:—That part of the finishing teeth which is formed with a 25° angle will follow in the unfinished thread groove that has been cut by the teeth $o$, $p$, $q$, 3, 4, and 5 that are made with a 22°—30' on one side, and that part of the finishing teeth which is formed with a 30° angle will follow in the thread groove that has been cut by the teeth $r$, $s$, $t$, 9, 10 and 11 that are formed with a 27°—30'. It will therefore be seen that a finishing chip by the 30° cutting teeth will be alternately removed from the opposite sides of the unfinished thread on the pipe which has been previously engaged by the cutting teeth previously formed on an angle of 27°—30'; and that the usual 60° angle thread will be formed by successive cutting teeth having a 30° angle oppositely arranged, as shown in Figs. 3 and 4; and that a small chip is therefore successively removed from opposite sides of the thread being cut which results in great ease of operation.

What I claim, is:—

1. A thread-cutting die, the cutting elements of which are provided with a plurality of sets or groups of teeth, the cutting edges of the individual teeth of each set being formed with different angles, and the root portions of one set of cutting elements being spaced from the root portions of another set of cutting elements, whereby portions of the stock material are successively removed from the opposite sides of the thread which is being cut.

2. A thread-cutting die, the cutting elements of which are provided with a plurality of sets of cutting teeth, the apexes of said teeth being in alinement, and the root portions of said teeth being in lines that are spaced from each other, as described.

3. A cutting die, each of the cutters or lands of which are provided with a plurality of sets of cutting elements, the cutting edges of said elements being formed with different angles, and the angles of the cutting edges of the individual teeth of each set being different.

FREDERIC E. WELLS.

Witnesses:
DAVID R. MOWRY,
DAVID B. MILLER.